(12) United States Patent
Dykhnich

(10) Patent No.: US 9,033,613 B2
(45) Date of Patent: May 19, 2015

(54) STRIPPING DEVICE FOR A SOIL COMPACTION ROLLER AND SOIL COMPACTION ROLLER, IN PARTICULAR TRENCH ROLLER

(71) Applicant: BOMAG GmbH, Boppard (DE)

(72) Inventor: Alexander Dykhnich, Neuwied (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 14/384,239

(22) PCT Filed: Mar. 8, 2013

(86) PCT No.: PCT/EP2013/000685
§ 371 (c)(1),
(2) Date: Jan. 5, 2015

(87) PCT Pub. No.: WO2013/135357
PCT Pub. Date: Sep. 19, 2013

(65) Prior Publication Data
US 2015/0110557 A1     Apr. 23, 2015

(30) Foreign Application Priority Data
Mar. 14, 2012 (DE) .......................... 10 2012 005 112

(51) Int. Cl.
*E01C 19/23* (2006.01)
*A01B 29/06* (2006.01)
*E02D 3/032* (2006.01)

(52) U.S. Cl.
CPC ................ *A01B 29/06* (2013.01); *E02D 3/032* (2013.01); *E01C 19/238* (2013.01)

(58) Field of Classification Search
CPC ........ A01B 29/06; E01C 19/238; E02D 3/032

USPC ................................... 404/121, 129; 172/606
See application file for complete search history.

(56) References Cited

U.S. PATENT DOCUMENTS

| 4,200,156 A | 4/1980 | van der Lely et al. |
| 4,378,052 A | 3/1983 | Anderson |

(Continued)

FOREIGN PATENT DOCUMENTS

| DE | 195 39 542 A1 | 5/1996 |
| DE | 297 14 595 U1 | 10/1997 |

(Continued)

OTHER PUBLICATIONS

The International Bureau of WIPO, English Translation of International Preliminary Report on Patentability and Written Opinion of the International Searching Authority, International Application No. PCT/EP2013/000685, mailed Sep. 25, 2014 (7 pages).

(Continued)

*Primary Examiner* — Raymond W Addie
(74) *Attorney, Agent, or Firm* — Wood, Herron & Evans, LLP

(57) ABSTRACT

The present invention relates to a stripping device for a drum of a soil compaction roller, in particular, a stripping device for a drum of a trench roller, wherein the stripping device comprises a first scraping element disposed on a drum surface. The drum surface is provided with protrusions disposed on the periphery of the drum surface, wherein a drum extender is adapted to be attached to the drum. Provision is also made for the stripping device to have a second scraping element which is mounted on the first scraping element in an axially displaceable manner, wherein the second scraping element is adapted for attachment to the first scraping element by means of at least one fixing means.

12 Claims, 12 Drawing Sheets

(56) References Cited

U.S. PATENT DOCUMENTS

| | | | |
|---|---|---|---|
| 5,511,901 A | | 4/1996 | Yates |
| 5,988,940 A * | | 11/1999 | Johansson .................. 404/129 |
| 6,206,611 B1 | | 3/2001 | Schreck |
| 2004/0114999 A1* | | 6/2004 | Runestad .................. 404/129 |
| 2005/0117971 A1 | | 6/2005 | Berg |

FOREIGN PATENT DOCUMENTS

| | | |
|---|---|---|
| EP | 1 411 175 A2 | 4/2004 |
| EP | 1 520 935 A2 | 4/2005 |
| EP | 0 898 020 B1 | 11/2006 |
| WO | 98/28495 A1 | 7/1998 |

OTHER PUBLICATIONS

Espacenet, English Machine Translation of DE19539542A1, published May 2, 1996, retrieved from http://worldwide.espacenet.com on Sep. 8, 2014 (4 pages).

Espacenet, English Machine Translation of WO9828495A1, published Jul. 2, 1998, retrieved from http://worldwide.espacenet.com on Sep. 8, 2014 (5 pages).

Espacenet, English Machine Translation of EP1411175A2, published Apr. 21, 2004, retrieved from http://worldwide.espacenet.com on Sep. 8, 2014 (7 pages).

Espacenet, English Machine Translation of EP1520935A2, published Apr. 6, 2005, retrieved from http://worldwide.espacenet.com on Sep. 8, 2014 (7 pages).

Espacenet, English Machine Translation of EP0898020B1, published Nov. 22, 2006, retrieved from http://worldwide.espacenet.com on Sep. 8, 2014 (9 pages).

German Patent Office, Search Report of Application No. 10 2012 005 112.3, dated Nov. 8, 2012 (5 pages).

European Patent Office, International Search Report of International Application No. PCT/EP2013/000685, dated Mar. 4, 2014 (4 pages).

European Patent Office, English Translation of International Search Report of International Application No. PCT/EP2013/000685, dated Mar. 4, 2014 (2 pages).

* cited by examiner

STRIPPING DEVICE FOR A SOIL COMPACTION ROLLER AND SOIL COMPACTION ROLLER, IN PARTICULAR TRENCH ROLLER

CROSS-REFERENCE TO RELATED APPLICATIONS

This application is a submission under 35 U.S.C. §371 of International Application No. PCT/EP2013/000685, filed Mar. 8, 2013, which claims priority to German Application No. 10 2012 005 112.3, filed Mar. 14, 2012, the disclosures of which are hereby expressly incorporated by reference herein in their entireties.

FIELD OF THE INVENTION

The present invention relates to a stripping device for a soil compaction roller and to a soil compaction roller, in particular, a trench roller, comprising a stripping device.

BACKGROUND OF THE INVENTION

Known soil compaction rollers or soil compacting machines comprise a multiplicity of protrusions, also referred to as tamping plates, which are disposed on the perimeter of a rotatable drum, usually in parallel rows. In the case of drums comprising protrusions, there is the problem of soil material adhering to the drum between the protrusions and the spaces between the protrusions, thus impairing the performance of the drum. It is known to arrange a stripping device comprising scraping teeth transversely to the direction of rotation of the drum in such a manner that the scraping teeth protrude into the spaces between the protrusions and mechanically remove dirt from the spaces between the protrusions upon rotation of the drum.

Machine parts, for example, drums and wheels, are thus those elements that are affected by undesirable dirt deposits. The width of the rotating machine parts can vary, thus necessitating adjustment of a stripping device according to the altered width. This is the case, for example, when drum extenders are used.

Exchangeable stripping elements in various widths are currently provided for various working widths of the rotating machine parts. This necessitates the exchange of at least parts of the stripping device. This means, therefore, that separate parts of the stripping device must be made available for different working widths. Furthermore, the exchange of parts for different working widths is often time-consuming.

SUMMARY OF THE INVENTION

It is thus the object of the present invention to provide a stripping device and a soil compacting machine comprising a stripping device which overcomes said disadvantages and which can be utilized for different working widths.

This object is achieved by means of a stripping device for a drum of a soil compacting machine wherein the stripping device comprises a first scraping element disposed on a drum surface. The drum surface comprises protrusions disposed around the perimeter of the drum surface and a drum extender can be attached to the drum. Provision is further made for the stripping device to comprise a second scraping element disposed on the first scraping element in an axially movable manner, wherein the second scraping element can be fixed to the first scraping element by means of at least one fixing means. The stripping device can be used for a drum of a soil compacting machine, in particular, for a drum of a trench roller. The object is further achieved by means of a soil compacting machine, in particular, a trench roller, that comprises a stripping device according to one embodiment of the present invention.

The stripping device according to one embodiment of the present invention comprises a first scraping element and a second scraping element. Provision is made for the first scraping element to be disposed on a drum surface provided with protrusions. Furthermore, a drum extender can be joined to the drum surface. Provision is made for the second scraping element to be disposed on the first scraping element in an axially movable manner wherein the second scraping element can be fixed on the first scraping element by means of at least one fixing means.

The width of the operating range of a drum can be varied by using two scraping elements resting one on top of the other and connected by a releasable connection, for example, bolts or clamps. Said connection can be released as required and the desired operating width can be adjusted for the purpose of cleaning the drum. It is not necessary for parts of the stripping device to be replaced, since the stripping device according to one embodiment of the present invention can be permanently present on the drum and is adjustable to suit the operating width of the drum.

It is advantageous to use a second, displaceable scraping element, since shifting of the second scraping element is easier to carry out than the exchange of the entire stripping device or parts thereof. During such shifting of the second scraping element, no attention need be paid to the position of the protrusions on the drum, since the first scraping element, upon release of the connection on the stripping device, can continue to be connected to the second scraping element and, when disconnected, can be moved over one or more protrusions.

Provision can be made for positive interlocking of the first scraping element with the second scraping element. In this respect, the positive interlocking of the connection is conveniently designed such that the two scraping elements cap be connected to each other in one alignment only. Misplacements during initial assembly of the second scraping element are thus obviated, for example, when retrofitting a conventional stripping device.

According to one exemplary embodiment of the present invention, provision can be made for at least one fixing means, for example, a bolt, to engage the first scraping element after passing through the second scraping element. For this purpose, the first scraping element and the second scraping element may have orifices, for example, round orifices or elongated orifices. Round orifices have the advantage that the second scraping element can be positioned in a predetermined position. The first scraping element provides a matching orifice, such that the first and second scraping elements can provide a first operating width in a first position and a second operating width in a second position.

In the case of elongated orifices or slotted holes, the length of the orifice may present a fixed stop also enabling freely selectable intermediate positions with respect to the second scraping element. An infinite adjustability is advantageous, since drum extenders of various dimensions can be considered without the need of prior knowledge of the relevant operating width.

Another advantage is the fact that no further elements need to be attached or detached when changes are applied to the operating width. For providing a stripping device for various operating widths, it is merely necessary to unfasten the provided fixing means. There is furthermore no risk of losing any parts, as all elements of the stripping device remain attached to the machine. Furthermore, the stripping device according to one embodiment of the present invention is user friendly, since it enables easy adjustment of any operating width.

Provision may be made, in one embodiment of the present invention, for the first scraping element to comprise a first limb and a second limb and for the second scraping element to comprise a third limb and a fourth limb with the third limb resting on the first limb and the fourth limb resting on the second limb.

Such geometry creating in each case a triangle with the limbs of the scraping elements is not sensitive to external influences. The triangular shape can be technically utilized for the purpose of guiding the dirt entrapped by the scraping teeth away from the drum. The limbs may be of the same length, with the result that the stripping device will develop the same effect independently of the direction of rotation of the drum.

According to one exemplary embodiment of the present invention, provision can be made for the first limb and the second limb of the first scraping element to form a guiding geometry with the third limb and the fourth limb of the second scraping element. No further elements are, therefore, necessary for moving the second scraping element on the first scraping element in a predetermined direction along the first scraping element.

Provision can further be made for the first limb and the second limb of the first scraping element to comprise a first identical geometry and for the third limb and the fourth limb of the second scraping element to comprise a second identical geometry. The first scraping element thus comprises identically formed front and rear sides. In the case of a second identical geometry, this will also apply to the front and rear sides of the second scraping element. Provision can further be made for the first geometry and the second geometry to be congruent, at least in their outer shape. The second scraping element can therefore, for example, be attached to the first scraping element with minimum space requirements at an overlapping position of the two scraping elements without affecting the function of the first scraping element.

According to one embodiment of the present invention, a soil compacting machine or soil compaction roller comprising at least one drum according to one embodiment of the present invention is further provided. The soil compacting machine can have, for example, an operating width of the drum with mounted drum extender of approximately 610 mm or possibly 850 mm. The soil compacting machine is preferably a trench roller.

Accordingly, the present invention can also be appropriately applied to other roller types, drums, and wheels of work machines.

BRIEF DESCRIPTION OF THE DRAWINGS

The present invention is explained below in detail with reference to exemplary embodiments. The present invention is, however, not limited to said exemplary embodiments, so that other combinations and applications are also applicable. In the diagrammatic drawings.

DETAILED DESCRIPTION OF THE INVENTION

Figure 1:
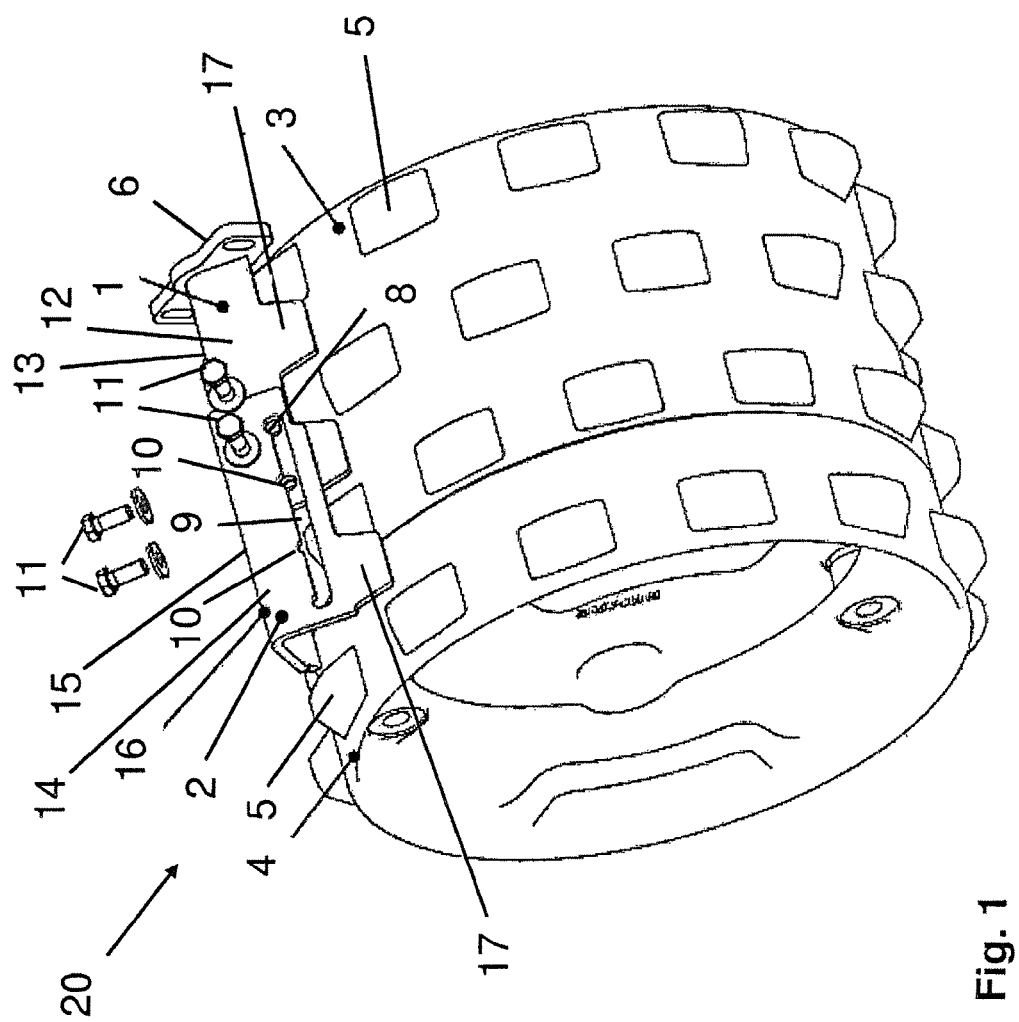
FIG. 1 is a partially exploded view of a first exemplary embodiment of a drum comprising a stripping device.

FIG. 1 shows a first exemplary embodiment of a drum 20 comprising a stripping device comprising a first scraping element 1 and a second scraping element 2. FIG. 1 shows the drum 20 representing a first half of a drum arrangement for a trench roller. Split drums 20 are used in the case of trench rollers so that a second half of the drum 20 (not shown in FIG. 1) is mirror-invertedly attached to the trench roller. In all, the trench roller comprises a front drum 20 and a rear drum 20, each having two halves, wherein the drum 20 in FIG. 1 can be part of either a front drum 20 or a rear drum 20. The drum 20 can be adjusted from a first operating width to a second operating width by means of a drum extender 4.

FIG. 1 shows the drum extender 4 attached to the drum 20. The drum 20 and the drum extender 4 comprise tamping plates in the form of protrusions 5. The protrusions 5 are disposed evenly spaced around the perimeter of a drum surface 3 in the form of offset rows on the perimeter of the drum 20. The perimeter of the drum extender 4 also carries protrusions 5 formed in a row set at a distance from one another on the perimeter. The drum 20 carries protrusions 5 arranged in three rows, wherein the positions of the protrusions 5 of the center row correspond to the positions of the protrusions 5 of the drum extender 4.

The first scraping element 1 is disposed above the drum 20 in an axial direction transversely to the direction of movement of the drum 20. The first scraping element 1 is attached to a fixed part in the form of a flange 6 of the soil compacting machine, also referred to as a soil compaction roller. The second scraping element 2 is disposed in an axially movable manner on the first scraping element 1 wherein the second scraping element 2 can be attached to the first scraping element 1 by means of at least one fixing means 11. With the drum extender 4 attached, the second scraping element 2 forms an extension of the first scraping element 1. The extension of the first scraping element 1 by means of the second scraping element 2 can be carried out after attaching the drum extender 4 to the drum 20 while the drum 20 is idle. The second scraping element 2 can be permanently mounted on the drum 20 and can be moved as required from its inner starting position to an outer, or working, position, as shown in FIG. 1.

The first scraping element 1 has a length, for example, of from approximately 20 cm to approximately 30 cm. The second scraping element has a length, for example, of from approximately 20 cm to approximately 30 cm. The first scraping element 1 is preferably of the same length as the second scraping element 2. In the cleaning position of the second scraping element 2, the first scraping element 1 and the second scraping element 2 preferably overlap over a distance of approximately 10 cm.

The first scraping element 1 comprises a first limb 12 and a second limb 13. The second scraping element 2 comprises a third limb 14 and a fourth limb 15 wherein the third limb 14 rests on the first limb 12 and the fourth limb 15 rests on the second limb 13. The first scraping element 1 and the second scraping element 2 each comprise an L-shaped profile consisting of two of the limbs 12, 13, 14, 15. The two L-shaped profiles are disposed one above the other and are disposed relatively to each other in an axially movable manner. The first scraping element 1 is rigidly attached to the flange 6. The second scraping element 2 is disposed in a movable manner on a rail in the form of an apex of the L-shaped profile formed by the second scraping element 2. The first scraping element 1 and the second scraping element 2 are each of a one-piece design and are made, for example, of bent metal.

FIG. 1 shows the two scraping elements 1, 2 enclosing a triangular space beneath the scraping element 1, 2 by means of their two respective limbs 12, 13, 14, 15 such that the apex of the triangle can be used as guiding geometry 16 or as a guide rail for displacement of the second scraping element 2 along the first scraping element 1. The apex of the triangle encloses, for example, an angle of from approximately 60 to approximately 120 degrees.

The two limbs 12, 13 of the first scraping element 1 in FIG. 1 are of a same first length, for example, 10 cm. The two limbs 14, 15 of the second scraping element 2 are likewise of a same second length. The first limb length of the first scraping element 1 is virtually equal to the second limb length of the second scraping element 2. In this way, a triangular cross section of the stripping device is formed below the first and second scraping elements 1, 2 forming an equilateral triangle in cross section.

As shown in FIG. 1, the first scraping element 1 and the second scraping element 2 each have scraping teeth 17 respectively extending the sides of the limbs 12, 13, 14, 15. The first scraping element 1 comprises two scraping teeth 17 on each limb 12, 13. The second scraping element 2 comprises a scraper tooth 17 on each limb 14, 15. The scraping teeth 17 on the second scraping element 2 can be geometrically dimensioned such that the scraping teeth 17 of the first scraping element 1 and those of the second scraping element 2 are spaced at the same distance apart due to the position assumed by the second scraping element 2 in its working position.

Provision is made for the first scraping element 1 above the drum surface 3 to be fixed in such a way that the scraping teeth 17 can remove dirt particles in the spaces between the protrusions 5 on the drum surface 3. The second scraping element 2 is mounted in an axially movable manner above the first scraping element 1 and can be used for the removal of dirt particles on the drum extender 4 when in its working position. Due to the fact that the drum 20 and the attached drum extender 4 move simultaneously at the same angular speed during operation of the drum 20, dirt on the drum surface 3 and on the drum extender 4 can be removed simultaneously. FIG. 1 shows such a working position in which the second scraping element 2 has been moved from its starting position to a working position with the drum 20 extended.

In FIG. 1, the second scraping element 2 partly covers the first scraping element 1 with the result that the two scraping elements 1, 2 can be connected by means of at least one fixing means 11, for example, a pin or a bolt. An exploded view in FIG. 1 shows four bolts 11, each comprising a washer, to be fitted.

In FIG. 1, the first scraping element 1 comprises two orifices in the shape of round orifices 8 on each limb 12, 13. The first scraping element 2 is provided with an orifice in the shape of an elongated orifice 9 on each limb, the elongated orifice 9 comprising four positioning notches 10. In the working position of the second scraping element 2, the positioning notches 10 are coincident with the two round orifices 8 of the first scraping element 1. The bolts 11 each pass through the second scraping element 2 to engage the round orifices 8 of the first scraping element 1. The round orifices 8 each comprise an inside thread to enable an external thread of a bolt 11 to engage the inside thread. Due to the use of an inside thread inside the round orifices 8 on the first scraping element 1, there is no necessity for a further fixing means, for example, a bolt nut, for the purpose of arresting the fixing means 11. The inside thread can also be provided by means of a welded nut, a screw-threaded plate, or similar suitable means.

Figure 2:
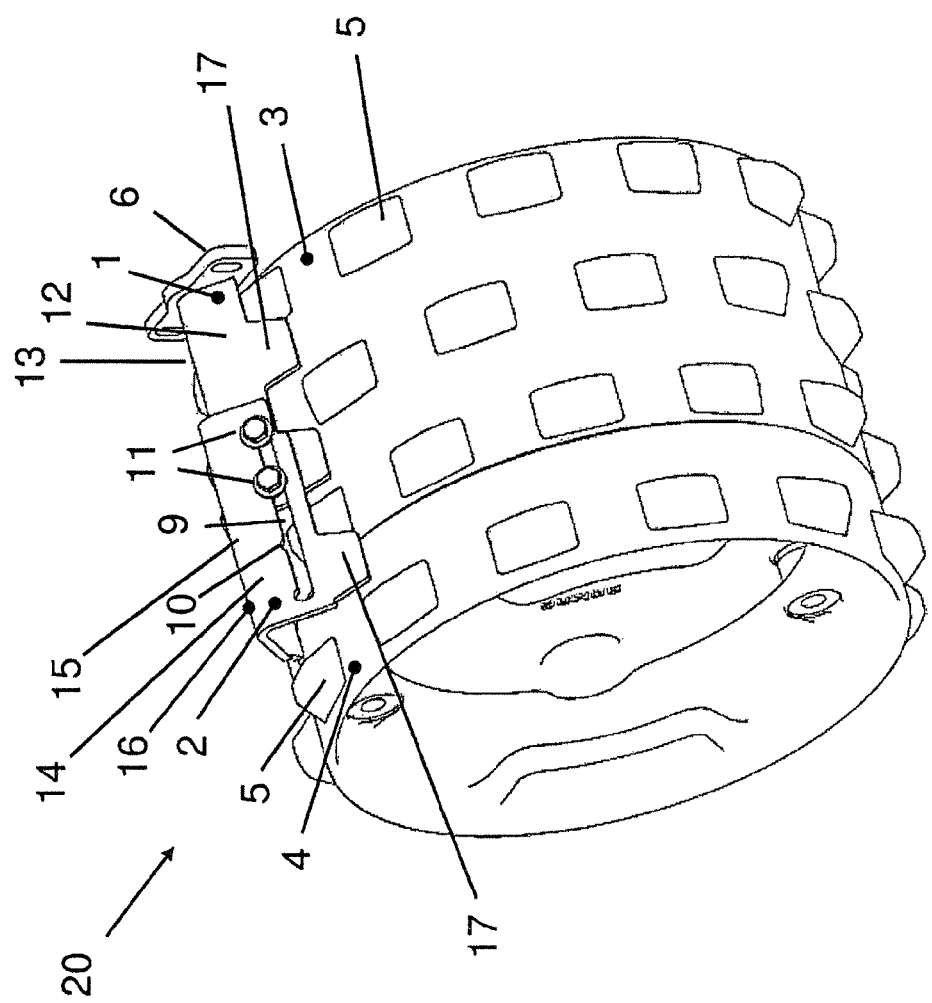
FIG. 2 shows the first exemplary embodiment of FIG. 1 with a drum extender mounted thereon.

FIG. 2 shows the drum 20 of FIG. 1 with the drum extender 4 fitted and with the second scraping element 2 disposed in an outer position for the purpose of cleaning the drum extender 4. The four bolts 11 in FIG. 1 are now fitted, securing the second scraping element 2 to the first scraping element 1. In such a working position, the second scraping element 2 is disposed partly on top of the first scraping element 1 and partly adjacent to the first scraping element 1.

Figure 3:
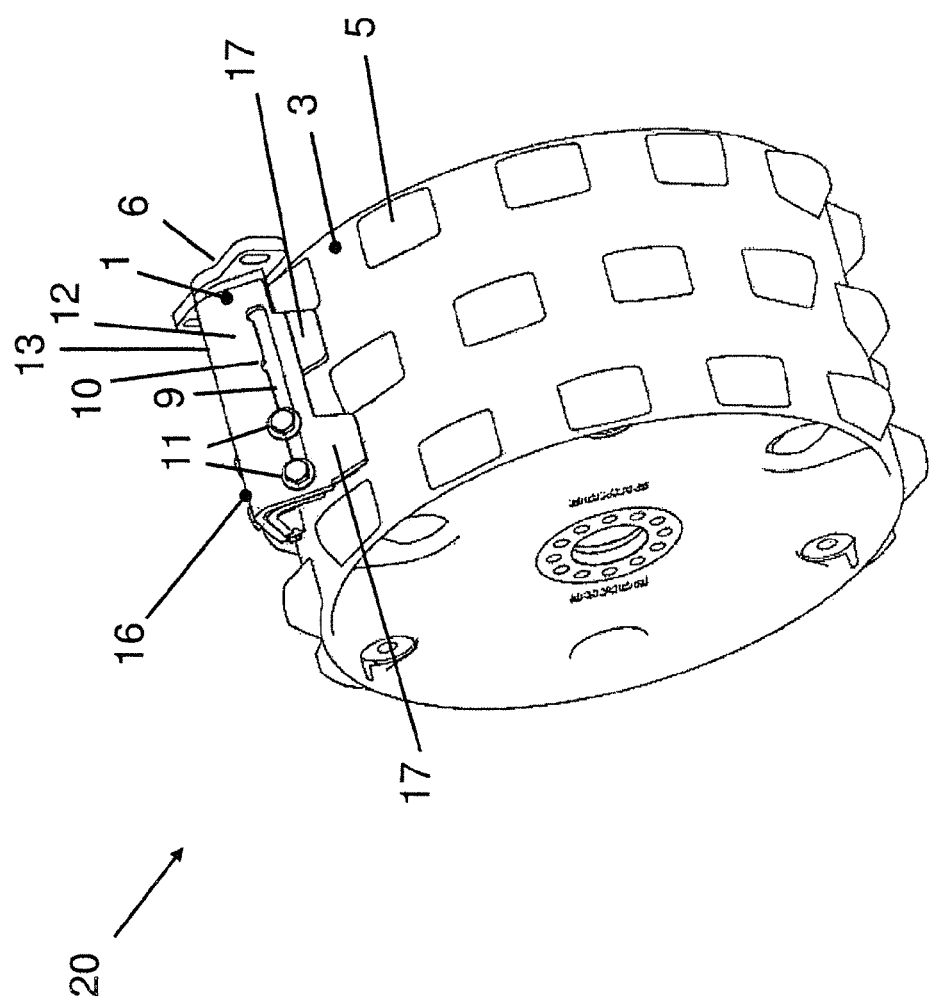
FIG. 3 shows the first exemplary embodiment of FIG. 1 with the drum extender detached.

FIG. 3 shows the drum 20 of FIG. 1 with the drum extender 4 detached. The second scraping element 2 is secured to the first scraping element 1 by means of the four bolts 11 such that the first and second scraping elements 1, 2 are positioned almost exactly one above the other. Due to the fact that the first scraping element 1 has two scraping teeth 17 per limb, the first scraper tooth 17 on each limb of the second scraping element 2 congruently overlaps a scraper tooth 17 of the first scraping element 1, whilst the second scraper tooth 17 of the first scraping element 1 remains uncovered. In order to reach an inner position of the second scraping element 2 of FIG. 3 from the outer position of the second scraping element 2 of FIG. 2, it is sufficient to loosen the four bolts 11 without removal thereof being necessary. During displacement from the first position into the second position, the bolts 11 can be guided within the slotted hole or elongated orifice 9 without the need to detach the second scraping element 2 from the first scraping element 1. This is made possible by the presence of the positioning notches 10, since these provide a space for lifting the second scraping element 2 away from the first scraping element 1 without it being necessary to remove the bolts 11. This enables the second scraping element 2 to be moved over the protrusions 5. This is particularly advantageous if the drum extender 4 is offset from the drum surface 3 such that protrusions 5 form a hindrance to movement of the second scraping element 2 from a first position to a second position. It is, furthermore, not always possible to guarantee that the drum 20 having a drum extender 4 will stop rotating in a position that is advantageous for the purpose of moving the second scraping element 2. Due to the combination of the slotted hole 9 and the positioning notches 10, it is possible to move the second scraping element 2 without detaching the fixing means 11.

Figure 4:
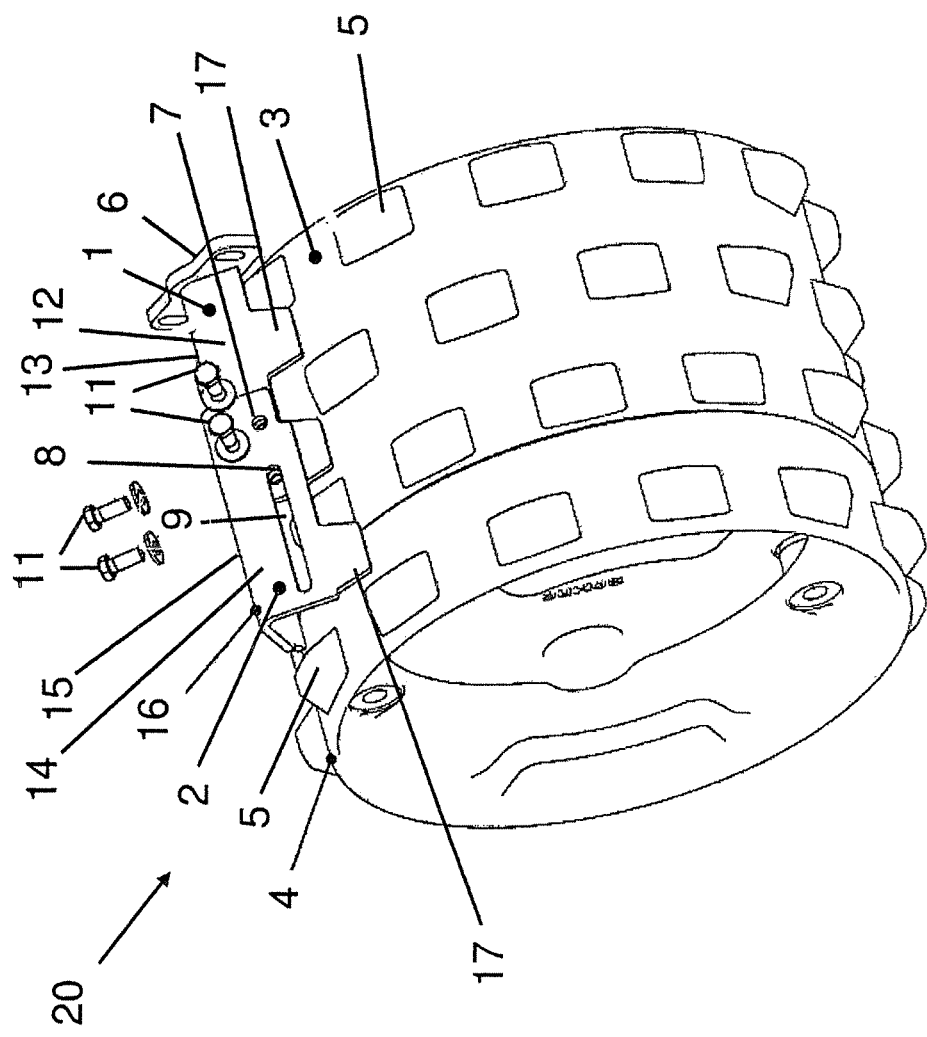
FIG. 4 is a partially exploded view of a second exemplary embodiment of a drum comprising a stripping device.

FIG. 4 shows an exploded view of a second exemplary embodiment of a drum 20 having a drum extender 4 attached thereto and comprising a stripping device. Unlike FIG. 1, the second scraping element 2 comprises a slotted hole 9 without positioning notches 10 and a round orifice 7. As shown in FIG. 1, the first scraping element 1 has two round orifices 8 each comprising screw threads on their limbs 12, 13. In overlapping position, the outer round orifice 8, which is the left-hand round orifice 8 in FIG. 4, of the first scraping element 1 and the inner end of the slotted hole 9 of the second scraping element 2 together form the outer position of the second scraping element 2. In this case, the inner, right-hand end of the slotted hole 9 serves as a stop member and as a positioning guide, whilst the round orifices 7, 8 serve to attach the second scraping element 2 to the first scraping element 1 in the desired position. In said position, the round orifice 7 of the second scraping element 2 overlaps the inner round orifice 8 of the first scraping element 1, and, additionally, the right-hand end of the slotted hole 9 overlaps the outer round orifice 8 of the first scraping element 1.

Figure 5:
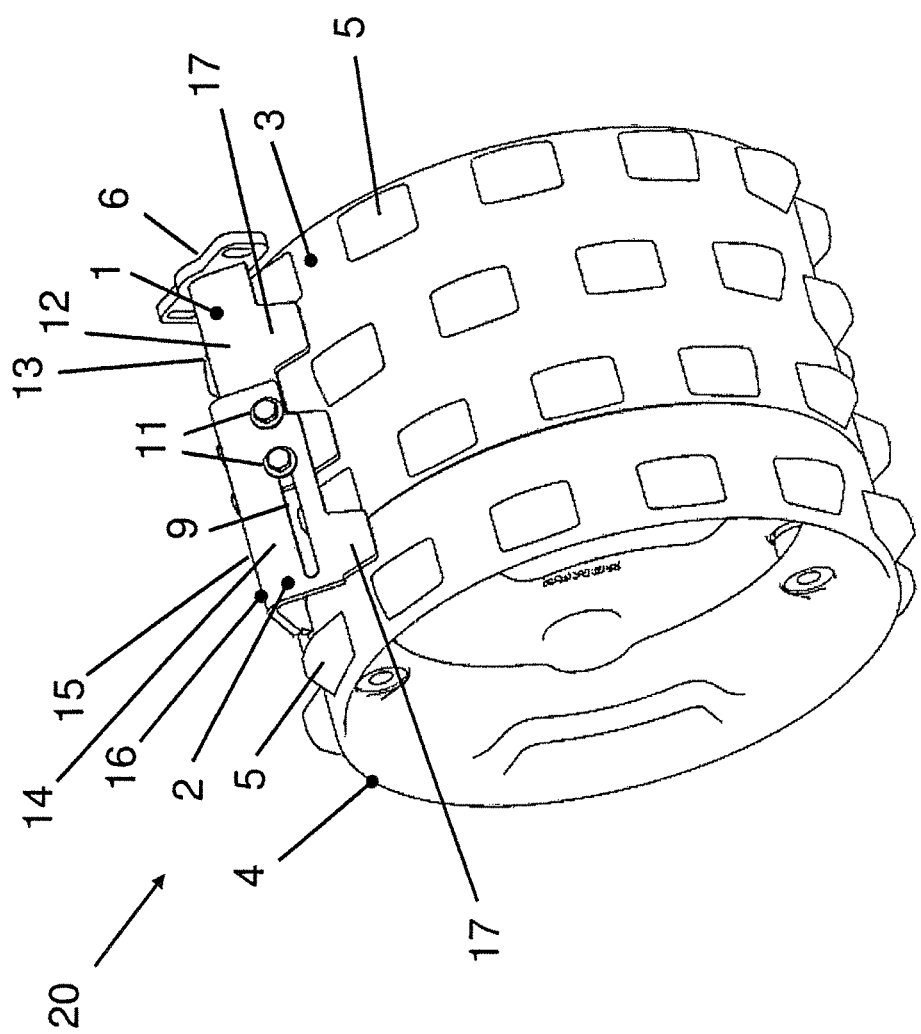
FIG. 5 shows the second exemplary embodiment of FIG. 4 with the drum extender mounted thereon.

FIG. 5 shows the drum 20 of FIG. 4 with the drum extender attached, whilst the four bolts 11 each engage the round orifices 8 of the first scraping element 1 on both sides of the second scraping element 2. Said round orifices 8 are visible in FIG. 4 and are concealed from view in FIG. 5 by the attached bolts 11.

Figure 6:
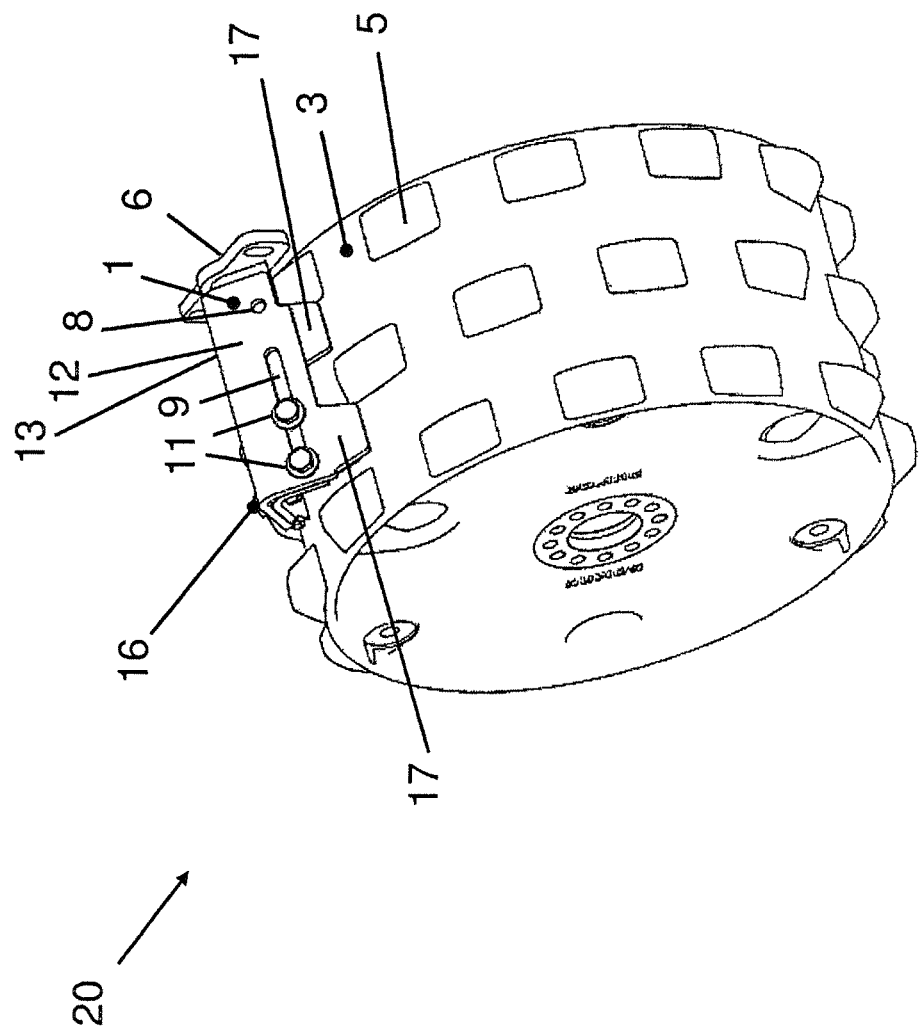
FIG. 6 shows the second exemplary embodiment of FIG. 4 with the drum extender detached.

FIG. 6 shows the drum 20 of FIG. 4 with the drum extender 4 detached. The second scraping element 2 is attached in its inner position to the first scraping element 1 by means of the four bolts of FIG. 5. The two bolts 11 on each limb are each disposed in the elongated orifice 9 and each engage a round orifice 8, which is visible in FIG. 4, of the first scraping element 1.

Figure 7:
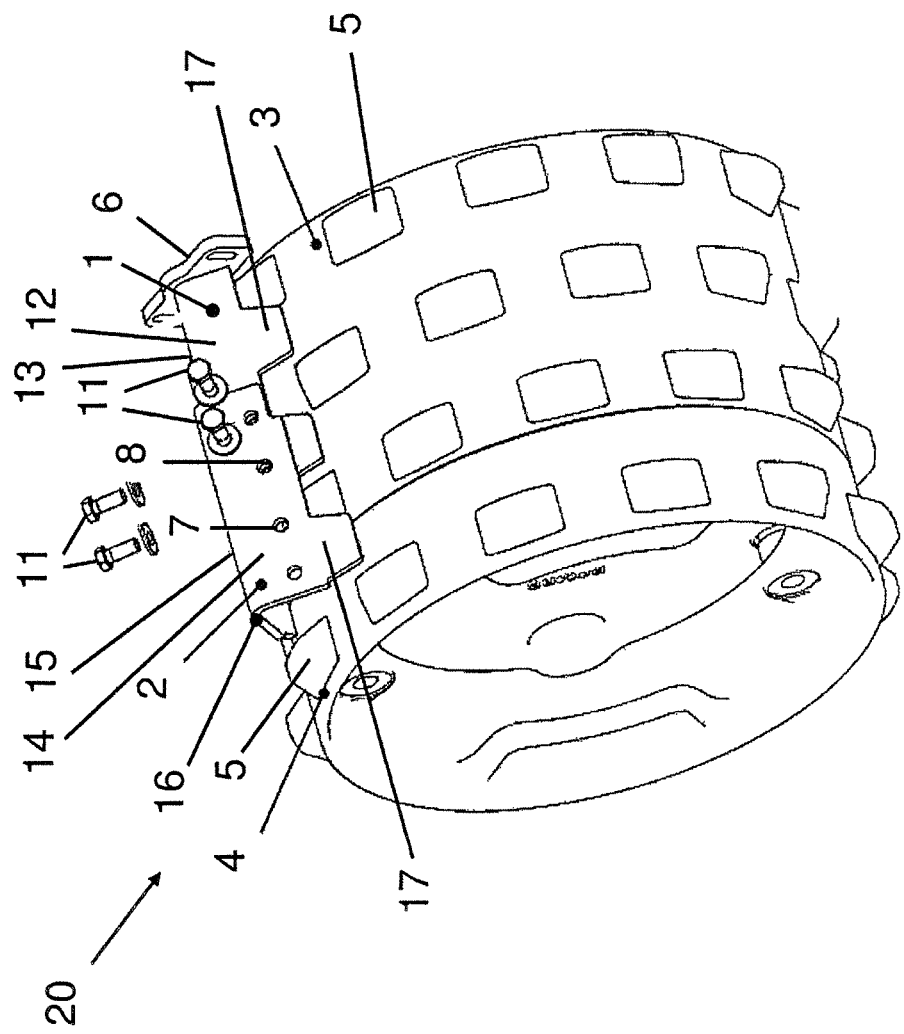
FIG. 7 is a partially exploded view of a third exemplary embodiment of a drum comprising a stripping device.

FIG. 7 is an exploded view of a third exemplary embodiment of a drum 20 with the drum extender 4 attached and comprising a stripping device. Unlike FIG. 1, the second scraping element 2 comprises four round orifices 7 on each limb for the purpose of receiving two bolts 11. The four round orifices 7 are disposed in a row alongside each other in the longitudinal direction of the second scraping element 2. Furthermore, the first scraping element 1 has two round orifices 8 with inside threads disposed at the same distance from each other as are the round orifices 7 on the second scraping element 2. Four bolts 11 are provided for the purpose of joining the two scraping elements 1, 2 together, with the round orifices 7 of the second scraping element 2 and the round orifices 8 of the first scraping element 1 being made to coincide with each other.

Figure 8:
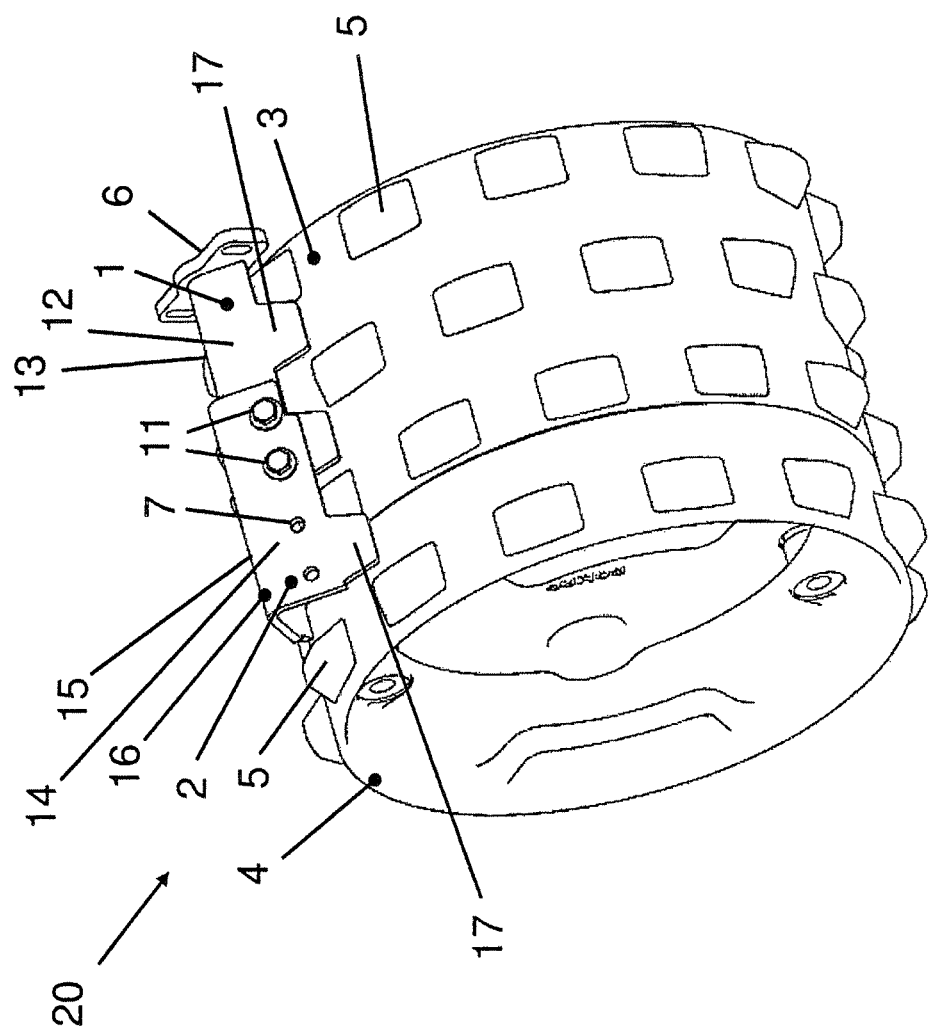
FIG. 8 shows the third exemplary embodiment of FIG. 7 with the drum extender mounted thereon.

FIG. 8 shows the drum 20 of FIG. 7 with the drum extender 4 attached thereto, with the four bolts 11 each engaging a round orifice 8 of the first scraping element 1 on each side of the second scraping element 2 and securing the second scraping element 2 in its outer position.

Figure 9:
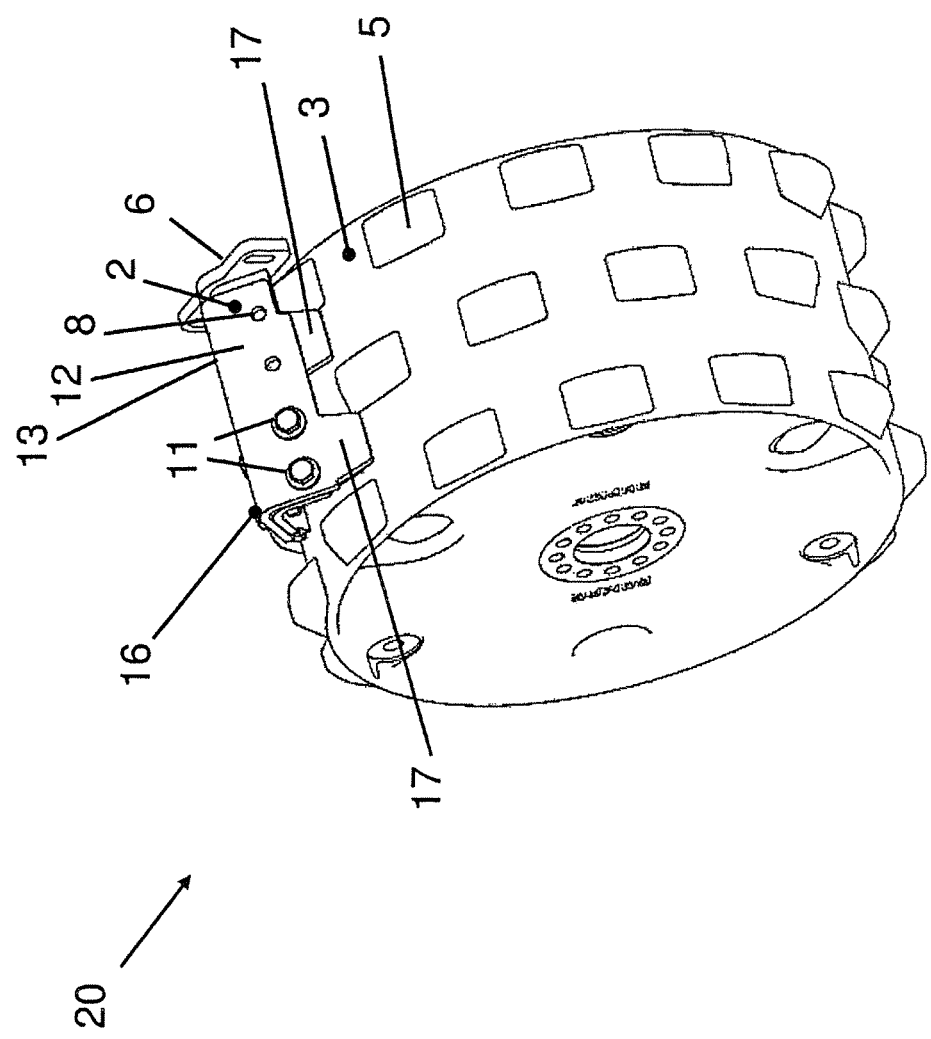
FIG. 9 shows the third exemplary embodiment of FIG. 7 with the drum extender detached.

FIG. 9 shows the drum 20 of FIG. 7 with the drum extender 4 detached. The second scraping element 2 is secured to the first scraping element 1 in its inner position by means of the four bolts 11, the bolts 11 being disposed in the two outer orifices of the limbs 14, 15.

Figure 10:
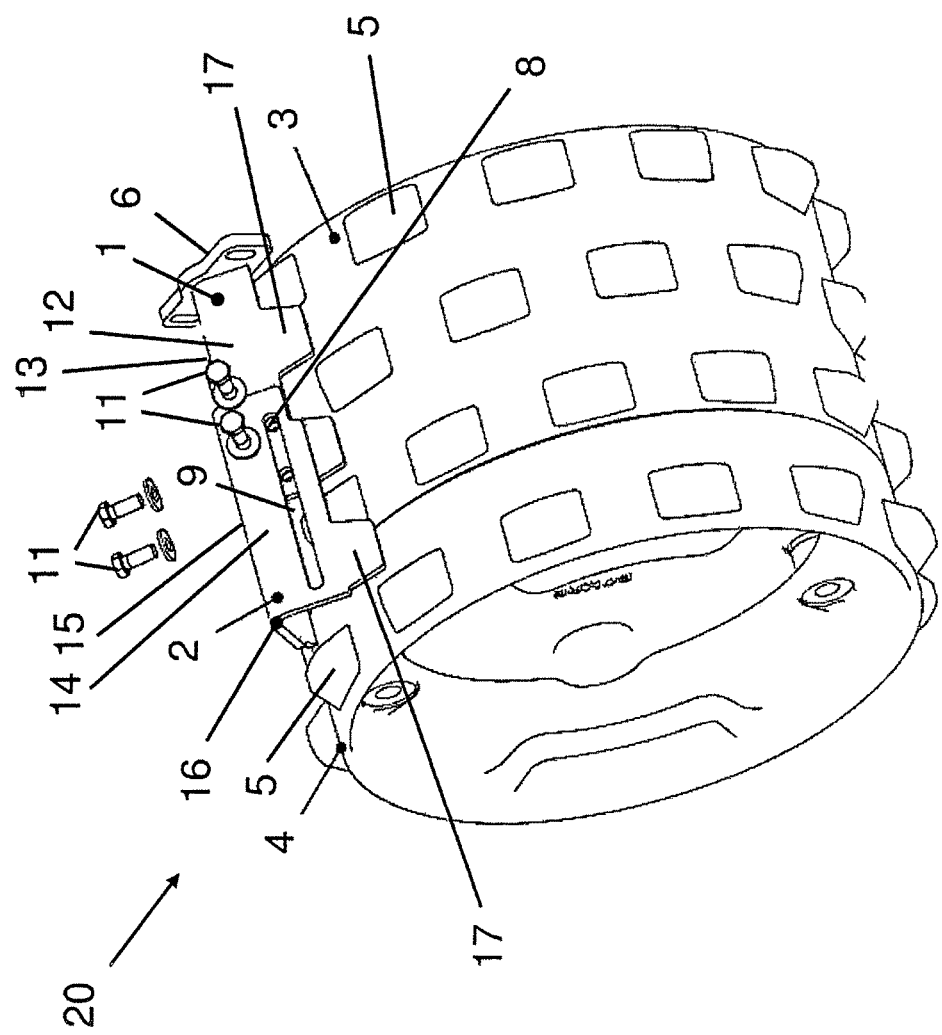
FIG. 10 is a partially exploded view of a fourth exemplary embodiment of a drum comprising a stripping device.

FIG. 10 is an exploded view of a third exemplary embodiment of a drum 20 with attached drum extender 4 and comprising a stripping device. Unlike FIG. 1, the second scraping element 2, in this case, comprises an elongated orifice 9 without the positioning notches 10. Unlike FIG. 4, the elongated orifice 9 extends over a greater length in the longitudinal direction of the second scraping element 2, so that the two outer ends of the elongated orifice 9 serve as positioning guides. The second scraping element 2 comprises a respective elongated orifice 9 on each of its limbs 14, 15. The first scraping element 1 comprises two round orifices 8 having an inside thread on each limb, as shown in FIG. 1. The end of the elongated orifice 9 on the second scraping element 2 serves as a stop member so that at least one bolt 11 is easy to position. Such positioning in FIG. 10 relates to the inner bolt 11 on the first limb 14 and the inner bolt 11 on the second limb 15 of the second scraping element 2.

Figure 11:
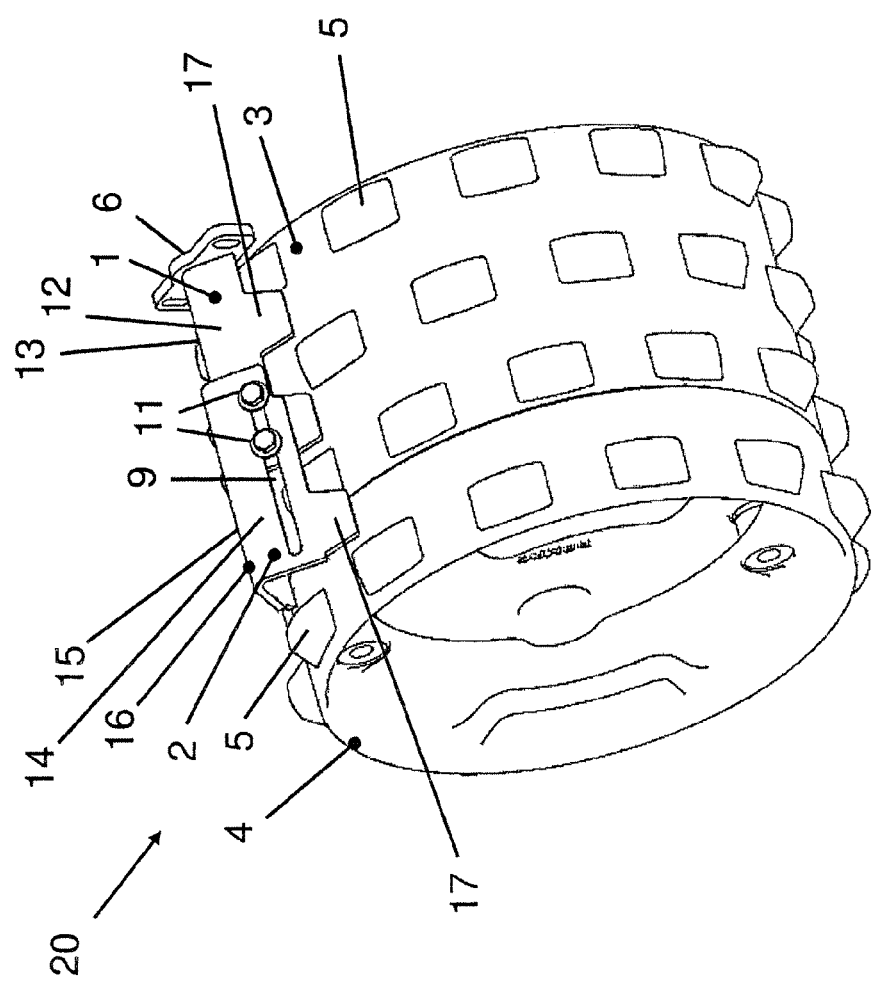
FIG. 11 shows the fourth exemplary embodiment of FIG. 10 with the drum extender mounted thereon.

FIG. 11 shows the drum 20 with attached drum extender 4 as shown in FIG. 10. A first bolt 11, the inner, right-hand bolt 11 in FIG. 11, engages the round orifice 8 of the first scraping element 1, visible in FIG. 10, and is at the same time positioned at the inner end of the elongated orifice 9. The second bolt 11 on the first limb 14 of the second scraping element 2 passes through the elongated orifice 9 to engage a second round orifice 8 of the first scraping element 1. The same arrangement of the bolts 11 is present on the second limb 15 of the second scraping element 2. In this way, the second scraping element 2 is attached in its outermost position to the first scraping element 1.

Figure 12:
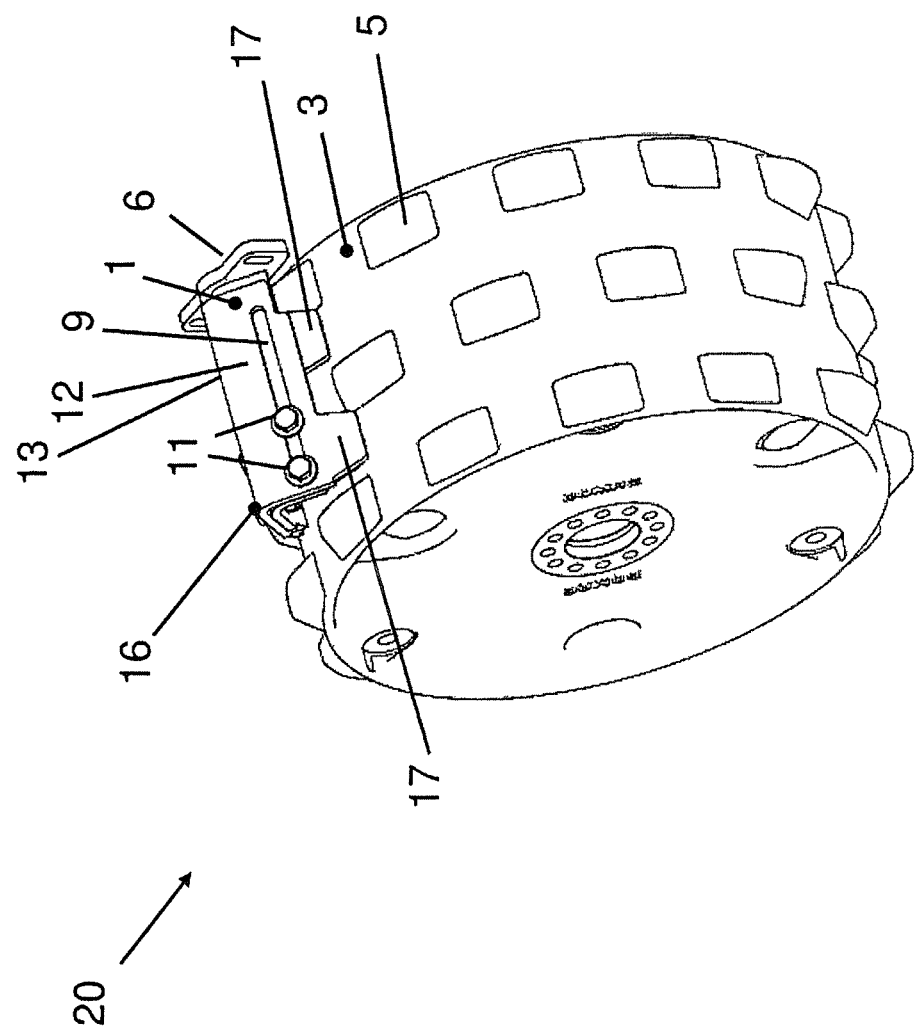
FIG. 12 shows the fourth exemplary embodiment of FIG. 10 with the drum extender detached.

FIG. 12 shows the fourth exemplary embodiment of FIG. 10 with the drum extender 4 detached and in which the second scraping element 2 covers the first scraping element 1 in its entirety. The two bolts 11 are each guided into one of the two round orifices 8 of the first scraping element 1, shown in FIG. 10, and engage the inside threads thereof. At the same time, the first bolt 11 is positioned at the outer end of the elongated orifice 9 of the second scraping element 2 and a further bolt 11 is positioned in a central region of the elongated orifice 9, the distance between the two bolts 11 on a limb 14, 15 being predetermined by the distance between the two round orifices 8 of the first scraping element 1.

Provision can be made, in further exemplary versions, for the stripping device to consist of more than two scraping elements, for example, three or four scraping elements. Such scraping elements can be mounted cascade-wise in an axially movable manner on a secured scraping element. Provision can further be made for more than one scraper tooth 17 to be disposed on a limb 14, 15 of the second scraping element 2. This is advantageous, for example, when the drum extender 4 comprises more than one row of protrusions 5 or when the drum extender 4 comprises an outwardly positioned peripheral surface area comprising a further peripheral surface to be cleaned adjacent to the protrusions 5. Provision can also be made for the scraping elements 1, 2 to be joined together by means of less than four bolts 11, for example, by one bolt 11 on each limb of the stripping device. Provision can also be made for the second scraping element 2 in its extended position to be capable of cleaning spaces on the drum 3 and also spaces on the drum extender 4 by means of its scraping teeth 17.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants invention.

What is claimed is:

1. A stripping device for a drum of a soil compaction roller, comprising:
    a first scraping element disposed on a drum surface of said drum,
    wherein said drum surface is provided with protrusions disposed on the periphery of said drum surface,
    wherein a drum extender is provided which is adapted for attachment to said drum,
    wherein said stripping device comprises a second scraping element which is disposed on said first scraping element in an axially movable manner, and further wherein said second scraping element is adapted for attachment to said first scraping element by least one fixation device.

2. The stripping device according to claim 1,
wherein said at least one fixation device passes through said second scraping element to engage said first scraping element.

3. The stripping device according to claim 1,
wherein said at least one fixation device is disposed in an orifice on said second scraping element.

4. The stripping device according to claim 3,
wherein said orifice is an elongated orifice.

5. The stripping device according to claim 4,
wherein said elongated orifice has positioning notches.

6. The stripping device according to claim 3,
wherein said orifice is a first round orifice.

7. The stripping device according to claim 6,
said at least one fixation device engages a second round orifice on said first scraping element.

8. The stripping device according to claim 1, wherein said first scraping element has a first limb and a second limb and said second scraping element has a third limb and a fourth limb, wherein said third limb rests on said first limb and said fourth limb rests on said second limb.

9. The stripping device according to claim 8,
wherein said first limb and said second limb form a guiding geometry together with said third limb and said fourth limb.

10. A soil compaction roller, comprising a stripping device according to claim 1.

11. The stripping device according to claim 1,
wherein said soil compaction roller comprises a trench roller.

12. The soil compaction roller according to claim 10,
wherein the soil compaction roller comprises a trench roller.

* * * * *